(12) United States Patent
Cochrane

(10) Patent No.: US 8,887,089 B2
(45) Date of Patent: Nov. 11, 2014

(54) SYSTEM AND METHOD FOR GENERATING A FILE PEEK AHEAD USER INTERFACE

(75) Inventor: Neil James Cochrane, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1031 days.

(21) Appl. No.: 12/029,686

(22) Filed: Feb. 12, 2008

(65) Prior Publication Data

US 2009/0204926 A1    Aug. 13, 2009

(51) Int. Cl.
*G06F 3/048*  (2013.01)

(52) U.S. Cl.
USPC ........... 715/805; 715/711; 715/860; 715/854; 715/855

(58) Field of Classification Search
USPC ......... 715/711, 816, 851, 805, 783, 762, 854, 715/855, 771, 964
See application file for complete search history.

(56) References Cited

U.S. PATENT DOCUMENTS

| 5,410,648 | A  | * | 4/1995  | Pazel  | 717/124 |
| 7,689,928 | B1 | * | 3/2010  | Gilra  | 715/787 |
| 2004/0237028 | A1 | * | 11/2004 | Softky | 715/501.1 |
| 2006/0061597 | A1 | * | 3/2006  | Hui    | 345/629 |

* cited by examiner

*Primary Examiner* — Weilun Lo
*Assistant Examiner* — Peiyong Weng
(74) *Attorney, Agent, or Firm* — Kilpatrick Townsend & Stockton LLP

(57) ABSTRACT

Systems and methods in accordance with various embodiments of the present invention provide for viewing a subset of a file in a secondary window, where a viewable portion of the file is displayed in a main window of a user interface. A user-selection of a reference marker made in the user interface is received. The reference marker corresponds to a point of interest in the file. Based on the selected reference marker, a location of the point of interest in the file is determined. A contextual boundary rule is applied in order to determine a location of a context portion of the file. The subset of the file is retrieved using the location of the point of interest and the location of the context portion of the file. The subset of the file is rendered in the secondary window.

19 Claims, 8 Drawing Sheets

```
private State _state = State.LARGE;

private int y0 = _lb.y;
private int y1 = _lb.y + ((_sb.y - _lb.y)/3);
private int y2 = _lb.y + (2*(_sb.y - _lb.y)/3);
private int y3 = _sb.y;

private Stroke _defaultStroke = new BasicStroke();
private Stroke _dashStroke = new BasicStroke(1, BasicStroke.CAP_SQUARE,
    BasicStroke.JOIN_RO Usage of rightCP2 private CubicCurve2D    _rightCP1.x = lbx1 - (int)(_complete*(rightDis));
private CubicCurve2D    _rightCP2.x = lbx1 - (int)(_complete*(rightDis));
                        _rightCP3.x = lbx1 - (int)(_complete*(rightDis));
private Point _leftCP1 = new Point(0, y1);
private Point _leftCP2 = new Point(0, y2);
private Point _leftCP3 = new Point(0, y3);
private Point _rightCP1 = new Point(0, y1);
private Point _rightCP2 = new Point(0, y2);
private Point _rightCP3 = new Point(0, y3);

public static int cpRadius = 3;

private double _complete = 0;

public MyCanvas() {
    setBackground(Color.BLACK);
```

```
if (resetPC) {
    // Get rid of any buffer since we draw from here and
    // we might draw something larger
    paintingComponent = jc;
    pIndex = pCount;
    offsetX = offsetY = 0;
```
```
int pCount = 0;
javax.swing.JComponent
```
```
}
}
pCountC++;
```

SYSTEM AND METHOD FOR GENERATING A FILE PEEK AHEAD USER INTERFACE

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates generally to computer user interfaces, and more particularly to a system and method for generating a graphical user interface that supports file peekahead techniques.

2. Description of the Related Art

It is often the case that files occupy several screens worth of information when being viewed within a display window. Browsing or editing files in the window becomes tedious causing a user to lose context while searching for specific sections of the file. The user would often have to scroll through an entire file screen by screen by pressing function keys assigned to a "scroll up" and "scroll down" function in an often futile attempt to find the specific section. Graphical interfaces introduced a scroll bar feature to aid the user in navigating large files. A scroll bar represents the entire file and is commonly associated with a display window. A display window can show only a small portion of a file at any one time. The scroll bar can contain a "slider". The slider's position in the scroll bar graphically indicates the relative position of the displayed portion to the entire file. One scroll bar is often used to indicate relative vertical position, while a second scroll bar can be used to indicate relative horizontal position. Although the slider and scroll bar provide relative positioning indicia of the portion of the file that is displayed in the window, the user cannot easily locate a specific section of the file without scrolling through the file itself.

Some techniques are known in the art to facilitate file navigation. One such technique is a file overview margin, which represents an entire file and is usually adjacent to the scroll bar. The file overview margin displays a graphical indicator, such as a colored block, to serve as a reference marker of a point of interest in the file. The relative position of the graphical indicator within the file overview margin can assist a user to find a specific section in a file. For example, if a source code file is contained in the window, the file overview margin may include red-colored graphical indicators to indicate compilation errors in the relative location of the file. This technique makes it easier for a user to quickly scan the file overview margin in order to identify a number and location of compilation errors within the file. The user can investigate various reference markers by placing a cursor over a particular graphical indicator and selecting the icon such as by clicking. By making the selection, the selected portion of the file comes into direct view within the window, causing other possibly relevant portions of the file to disappear from view.

While helpful, this technique loses much of its effectiveness because the user is required to scroll or jump to the specific portion of the file or file in order to understand the meaning of the reference marker. Moreover, by jumping to the location of the file identified by the reference marker, the user loses the initial position of the insertion point within the file. Additionally, it is not possible to select other reference markers and view the corresponding points of interest within the file without further deviating from the initial position within the file.

Previous solutions, such as Adobe Reader available from Adobe System Incorporated of San Jose, Calif. provide thumbnail previews of each page of a multi-page file. However, a thumbnail preview does not provide targeted context portion about the point of interest in the file. Essentially, the thumbnail preview does not zero-in on information that provides targeted context to the point of interest in the file. Instead, the user is forced to scan at least the entire preview page for context portion. Prior art solutions for tooltips or popup windows provide a hint or short description of a reference marker or the point of interest in the file. The hint or short description is generally far too minimal, leaving the user with no alternative other than to scroll through the file in order to gather context portion relating to the point of interest in the file. The usual information that is provided in a tooltip includes the nature of the reference marker and possibly the location in the file of the point of interest, such as "compilation error on line 36." The user ultimately cannot resolve the error without more context portion. When the popup window includes a portion of the file, such as showing line 36 from the file as containing the compilation error, an exact rendering of that portion of the file is not provided. Instead, these prior art systems provide a common tooltip or popup window format which does not seek to preserve the formatting that was originally provided for example by the creator of the file. As such, the user is again forced to navigate through the file in order to gather context portion relating to the point of interest in the file.

BRIEF SUMMARY OF THE INVENTION

Embodiments of the present invention address the foregoing and other such problems by providing systems and methods for generating a file peek-ahead user interface. In one embodiment, a subset of a file may be viewed in a secondary window, where a viewable portion of the file is displayed in a main window of a user interface. A user-selection of a reference marker is made in the user interface. The reference marker may correspond to a point of interest in the file. Based on the selected reference marker, a location of the point of interest in the file is determined. A contextual boundary rule may be applied in order to determine a location of a context portion of the file. The subset of the file may be retrieved using the location of the point of interest and the location of the context portion of the file. Lastly, the subset of the file is rendered in the secondary window.

In one set of embodiments, a systems and methods for viewing a subset of a second file in a secondary window are provided, where a viewable portion of a first file is displayed in a main window, and where the viewable portion of the first file does not include the subset of the second file. A user-selection of a reference marker made in the main window is received. The reference marker may correspond to a point of interest in the second file. Based on the selected reference marker, a location of the point of interest in the second file is determined. Characteristics information which specifies one or more characteristics of the point of interest identified by the selected reference marker may also be determined. Moreover, a location of a context portion of the second file is determined by applying a contextual boundary rule based on the characteristics information. The subset of the second file is retrieved using the location of the point of interest and the location of the context portion of the second file. The subset of the second file may then be rendered in the secondary window.

One advantage of the embodiments described herein is that a user may view a point of interest in the file without having to scroll to the point of interest in a main display window and without having to move an insertion point or a displayed portion of the file in the main window. Through the use of a separate secondary window, such as a popup window, the user can peek into various parts of the file that are not shown in the display window. The secondary window displays a subset of the file, which includes not only the point of interest but also additional portions of the file which are relevant to the user for determining the context of the point of interest.

Another advantage is that the secondary window provides an exact rendering of the subset of the file. This enables original formatting to be preserved, which aids in the readability of the subset. The exact rendering is displayed in a secondary window exactly as it would appear as if the user scrolled to the point of interest in the main window. Yet another advantage is that the systems and methods provided herein can be applied to any type of file that is capable of being marked, such as by book-marking. The secondary window is also useful for viewing points of interest which are only partially visible on the main display window. Where points of interest within a file are truncated, for example a right hand margin and text which has been truncated in order to fit within a small main display window, the secondary window can provide a rendering of the entire point of interest and/or a context portion without having to manipulate a slider of a scroll bar, such as a horizontal scroll bar. Thus, the entire point of interest can be seen by the user without moving windows or removing split screens and without moving an insertion point in the main display window.

A further understanding of the nature and the advantages of the embodiments disclosed herein may be realized by reference to the remaining portions of the specification and the attached drawings.

BRIEF DESCRIPTION OF THE DRAWINGS

The invention may best be understood by reference to the following description taken in conjunction with the accompanying drawings in which:

FIG. 3 shows a screenshot of an exemplary rendering of a subset which corresponds to a reference marker selected by mouseover of a graphical indicator within a file overview margin of a main window.

FIG. 4C shows another screenshot of an exemplary rendering of a subset which corresponds to a reference marker selected by positioning a cursor over an element in a file displayed in a main window.

DETAILED DESCRIPTION OF THE INVENTION

Figure 1A:
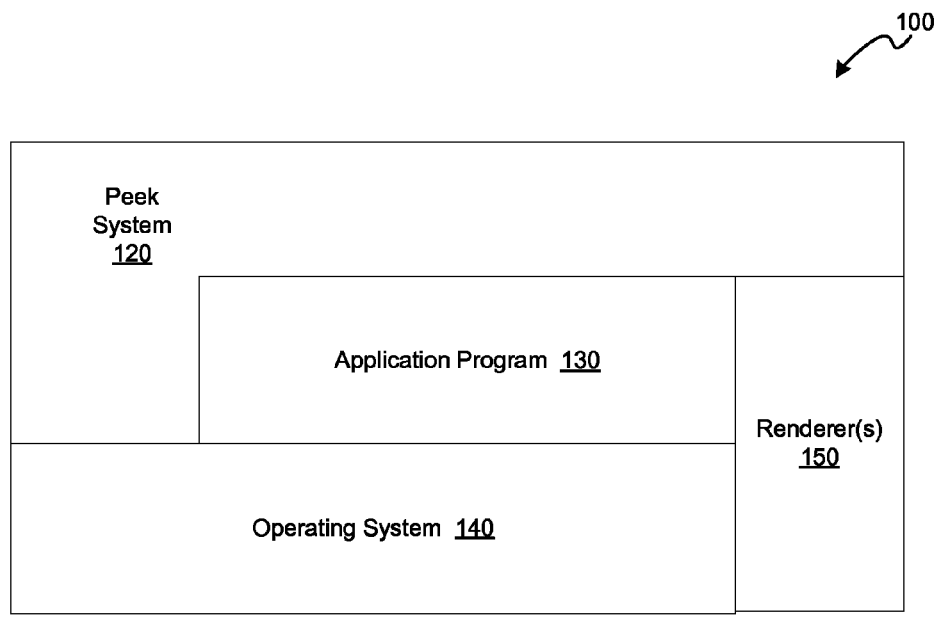
FIG. 1A illustrates a simplified block diagram for a peek system for generating a graphical user interface that supports file peek-ahead techniques in accordance with one embodiment of the present invention.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention provide systems and methods for generating a file peek-ahead user interface, which enables an exact rendering of a point of interest in a file and a context portion to be viewed upon user-selection of a reference marker within a file overview margin. Current methods of providing targeted information about a reference marker within a file overview margin are performed via tooltips. These methods provide insufficient information about a point of interest in the file, which causes inefficiency for the user who must then scroll through the file to locate information which provides more context to the point of interest in the file. Moreover, by scrolling through the file, the user must deviate from an initial placement of an insertion point within the file. This causes further inefficiency when the user must again scroll through the file to locate where the user last left off in the file. Specific embodiments of the systems and methods described herein may be particularly useful for editing software, including document editing, as well as for integrated development environment (IDE) software for editing of computer code. Embodiments of the present invention overcome these and other problems and facilitate a file peek-ahead user interface.

DEFINITIONS

As used herein, a file is a block of information which is available to a computer program for use. Various types of files are described herein. For example, in a word-processing program, a user manipulates document files or text files. In an IDE software program, a user/programmer manipulates source code files. Other file types include graphics files, speadsheets, and web files such as HTML, among others.

A point of interest is a specific location within a file, such as a line, statement, or word in the file. A reference marker is an indication within a file overview margin which corresponds to a particular point of interest. A reference marker identifies a characteristic of the corresponding point of interest. A reference marker can be in the form of a graphical indicator within a file overview margin. A reference marker can also be in the form of a cursor position within a scroll bar. A reference marker can also be an element in the file (i.e., a function name, a variable, etc.) which is defined in some way within the file or within another file.

A subset of a file includes a point of interest and a context portion. The context is a portion of the file or another file which lends context to the point of interest. An "insertion point" is the location in a main display window determined to correspond to a user action which results in a contact with a user input device. Methods of determining an insertion point include, but are not limited to, detecting a user action such as a mouse click whereby the insertion point is determined to correspond to the location of the mouse cursor at the time the mouse button is first depressed.

In the description that follows, embodiments will be described in reference to subsystems on a platform for a software application, such as a database application. However, embodiments are not limited to any particular architecture, environment, application, or implementation. For example, although embodiments will be described in reference to IDE software and file editors, aspects of the invention may be advantageously applied to any software application and platform. Therefore, the description of the embodiments that follows is for purposes of illustration and not limitation.

FIG. 1A illustrates a simplified block diagram for a peek system for generating a graphical user interface that supports file peek-ahead techniques in accordance with one embodiment of the present invention. As shown, system 100 includes a peek system 120 communicatively coupled to application program 130 and operating system 140. One or more application programs, such as application program 130, may be "loaded" (i.e., transferred from storage into memory for execution by a computer system). Application program 130 is communicatively coupled to the peek system 120 and the operating system 140. Exemplary application program 130 includes, for example, word processing software programs, spreadsheet software programs, integrated development environment (IDE) software programs, and others. Peek system 120, application program 130, and operating system 140 are also communicatively coupled to renderer(s) 150. Renderer(s) 150 may receive instructions to draw elements of a graphical user interface. Renderer(s) 150 may be a processor that executes a set of instructions to display the elements on a display device. In another embodiment, renderer(s) 150 may be a software module that generates the set of instructions to display the elements on the display device. It should be mentioned that the systems shown are merely exemplary and for purposes of explanation. Those of ordinary skill in the art would appreciate that any number of other systems may also be communicatively coupled to the peek system 120.

In one embodiment, the application program 130 is launched in a main display window. The main window may include a graphical user interface for interaction with the launched application. Application program 130 such as file viewers and file editing applications may display documents and/or files within a display region of the main window. Where the file occupies more area than the display region of the main window, leaving only a small portion of the file to be displayed in the main window at any one time, a graphical interface featuring a scroll bar is used. The scroll bar may contain a slider. The slider position in the scroll bar graphically indicates the location of the visible portion of the file that is displayed in the main window relative to the entire file. A file overview margin may be used to facilitate navigation through the file. Graphical indicators may be generated by the file overview margin system 180. The points of interest of a file may be represented graphically by the graphical indicators. The graphical indicators may be placed within a file overview margin and may be used as reference markers to represent points of interest in the file. The relative position of the graphical indicators within the file overview margin indicates the location of the corresponding point of interest relative to the entire file. For example, rectangular shaped graphical indicators may indicate a reference marker representing a point of interest in the file, where the position of the reference marker to the file overview margin corresponds to the relative position of the point of interest to the entire file. The reference marker may identify a wide variety of characteristics of the point of interest. For example, where the application program 130 is a document file editor, such as Microsoft Word®, reference markers in the form of graphical indicators may identify spelling errors or bookmarks. Where the application program 130 is an integrated development environment (IDE) having a code editor, such as JDeveloper™ produced by Oracle Corporation of Redwood Shores, Calif. reference markers in the form of graphical indicators may identify compilation errors, "To Do" items, warnings, and breakpoints in a source code file. Reference markers in the form of graphical indicators may be color-coded, where each color identifies a unique characteristic, such as a type of compilation error. For example, a red graphical indicator may identify a compilation error. A yellow graphical indicator may identify a compilation warning, such as a missing semi-colon, before some portion of the code. A green graphical indicator may identify an unused variable. A blue graphical indicator may identify a syntax error before some portion of the code.

In one embodiment, the peek system 120 enables an exact rendering of a subset of the file that corresponds with a user-selected reference marker, for example in a secondary window such as a popup window. A user may select the particular reference marker in a file overview margin by hovering a cursor in proximity to the reference marker, such as by mouseover. The peek system 120 may then determine the subset of the file. The subset includes the point of interest of the file that corresponds with the selected reference marker and also includes an additional portion of the file. The additional portion of the file is selected in order to provide context to the point of interest. The context portion need not be contiguous to the point of interest. Once the appropriate subset is determined, the peek system 120 sends an instruction to the renderer 150 to provide an exact rendering of the subset in the secondary window.

Figure 1B:
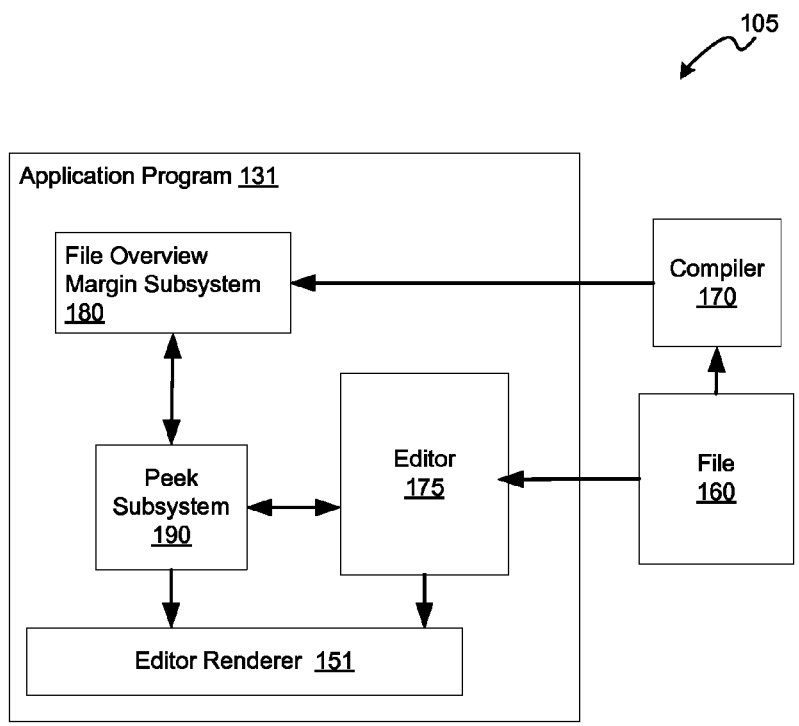
FIG. 1B illustrates an exemplary operating environment for a peek system for generating a graphical user interface that supports file peek-ahead techniques in accordance with one embodiment of the present invention.

FIG. 1B illustrates an exemplary operating environment for a peek system for generating a graphical user interface that supports file peek-ahead techniques in accordance with one embodiment of the present invention. Operating environment 105 includes application program 131. In one embodiment, application program 131 is an IDE application including a computer code file editor 175. A computer code file 160 may be loaded into the editor 175 and may be subsequently rendered and displayed within the main display window. In one embodiment, the editor renderer 151 is used to render the file 160 in the main display window. The application program 131 further includes a file overview margin subsystem 180 which generates and manages the file overview margin within the main display window. In order to generate the file overview margin, the file 160 is loaded into compiler 170. Compiler 170, which may also be known as an "auditor," provides to the margin subsystem 180 a list of possible compilation errors within the computer code file 160. The list may include a string or the text of the statement/element which produces the error or a short description of the error. The compiler 170 also provides a location (i.e., file identifier, character start offset within the file, character end offset within the file, etc.) within a file of the error-prone statement or other point of interest and standard format data for rendering the text, such as the color. The compiler provides the foregoing as input to the file overview margin 180, which in turn generates reference markers in the file overview margin corresponding with each error identified by the compiler 170 within the list.

Prior art systems include a tooltip subsystem contained within the application program 131 which is communicatively coupled to the overview margin subsystem 180. Upon mouseover of a reference marker within the file overview margin, the prior art uses the tooltip subsystem to generate a tooltip window. In essence, the file overview margin system 180 provides to the tooltip subsystem the text (of the statement/element which produced the error or the short description of the error) and/or the location information subject to the standard format data, which were provided by the compiler 170. The tooltip subsystem then generates the tooltip window using only the string/text, location, and the format data that was provided by the file overview margin system 180. Thus, prior art systems only render the information that was provided. Additionally, the prior art does not use the same renderer as the editor 175 when displaying the file 160 in the main window and thus does not provide an exact rendering.

In one embodiment of the present invention, upon selection of a reference marker (such as by user mouseover of a graphical indicator), peek subsystem 190 determines the location of the point of interest. In one embodiment, the file overview margin system 180 provides the location of the point of interest along with the other information provided by the compiler 170 to the peek subsystem 190. Using the location of the point of interest, the peek subsystem 190 determines a location of a context portion of the file that would be relevant to the user's understanding of the point of interest. The peek subsystem 190 then retrieves from the editor 175 a subset of the file comprising the point of interest and context, using the location of the point of interest and the location of the context portion. Once the subset has been retrieved, the peek subsystem 190 sends an instruction to the editor renderer 151 to draw the retrieved subset of the file 160. Thus, unlike the prior art, a subset of the file is actually grabbed from the file and then rendered within a secondary window. Moreover, the same renderer (i.e., the editor renderer 151) is used to render the secondary (peek-ahead) window as the editor 175 uses to render the file in the main window. This allows for the secondary window to render the subset in exactly the same way as the subset would be rendered in the main window. It should be noted that the peek subsystem 190 may be integrated within the application program 130 as displayed in FIG. 1B or may be communicatively coupled with an application program as displayed in FIG. 1A. Furthermore, systems or modules other than the compiler 170 may be used to supply location and other information to the file overview margin system 180.

It should be noted that the point of interest can be present within the file that is displayed in the main window, or can be present within another file. For IDE software, during the compilation process, various files may be tied together. For example, header files containing function definitions or library files may be incorporated by reference (i.e., using the #include directive, etc.) within a main application file. Other well known methods of tying together or relating a group of files may be used. As long as the compiler is aware of all the files that are tied together for a particular application, the point of interest can be present in any one or more of these files. FIGS. 4B and 4C further illustrate this concept in the context of peeking at a function or variable definition in another file. Thus, the peek subsystem may be implemented to enable the rendering of subsets across multiple files. For example, the overview margin can be implemented to enable peek-ahead techniques to other files, beyond the file displayed in the main window.

Figure 2:
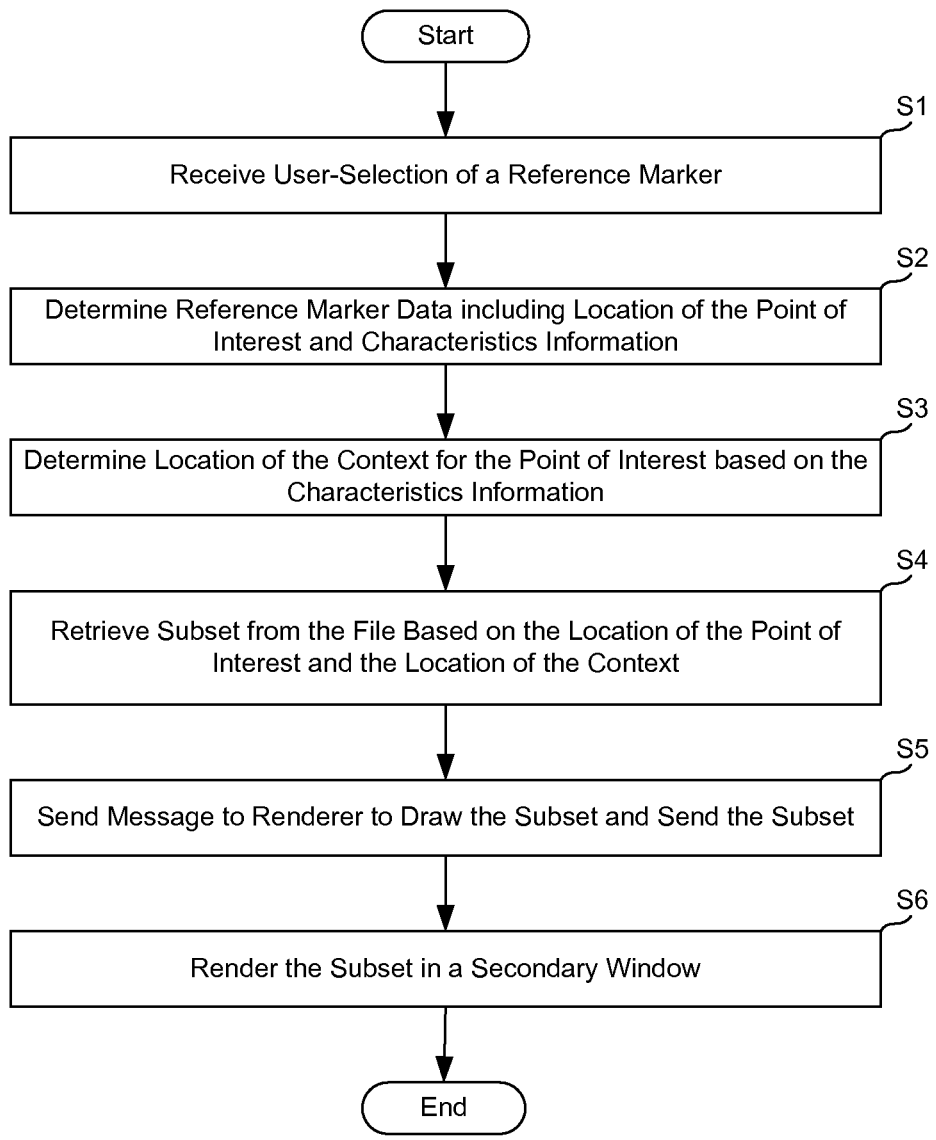
FIG. 2 is an exemplary process flow diagram which illustrates the steps performed in determining a subset of a file and rendering the subset of the file within a secondary display window in accordance with one embodiment of the present invention.

FIG. 2 is an exemplary process flow diagram which illustrates the steps performed in determining a subset of a file and rendering the subset of the file within a secondary display window in accordance with one embodiment of the present invention. At step S1, a user-selection of a reference marker is received. In one embodiment, the user may make the selection by placing a cursor over a region of the reference marker on the file overview margin, for example, using the mouseover function. As previously mentioned, positions of reference markers on the file overview margin indicate a relative location of a point of interest within the file. Reference markers on the file overview margin can be predetermined, for example by IDE software modules, appearing as graphical indicators on the file overview margin. The reference markers can be also be selected by a position of the cursor within the file overview margin. For example, a reference marker may be indicated by a user placing a cursor over a portion of the file overview margin and depressing a key or right-clicking a mouse. In yet another embodiment, the reference marker can be selected by placing a cursor over a function name or variable in the file displayed on the main window and concurrently depressing a key or clicking a mouse. The function name or variable is previously defined in the file.

At step S2, reference marker data is determined based on the user-selected reference marker from step S1. Marker data includes information that identifies the location of the point of interest within the file that corresponds with the reference marker. Where the selected reference marker is a predetermined graphical indicator, the software program that generated the graphical indicator also associated the location information. For example, an IDE software program may have run a compile module to determine various possible compilation errors with a source code file. The location of each compilation error is determined by the IDE software program when generating and placing the graphical indicators within the file overview margin. The peek system may determine the location information by receiving data about the point of interest from the compiler via the file overview margin system.

In another embodiment, the selected reference marker is a function name or variable within the file displayed in the main window. Similar to the predetermined graphical indicator in the overview margin, the reference marker within the main window is also associated with a point of interest within the main window. Again, the location of the point of interest may be determined by a compiler. It should be noted that when a compiler is run, information on each function and variable is generated, including location information about where the functions and variables are defined in a file.

Where the selected reference marker is determined by the position of the cursor within the file overview margin, the file overview margin system determines the location of the point of interest by correlating the relative position of the cursor within the file overview margin to a relative position in the file. This relative position in the file is the point of interest that corresponds with the reference marker.

Reference marker data may also include characteristics information. The reference marker may identify a variety of characteristics of the point of interest, such as spelling mistakes, compilation errors, bookmarks, or definitions. For example, when running a compilation process to identify possible compilation errors and generating graphical indicators within the overview margin, the IDE software may determine characteristics of the point of interest in the file; Reference markers may indicate more specific characteristics of the file, such as specific types of compilation errors (undeclared variable, missing semi-colon error, etc.).

At step S3, the location of an appropriate context for the point of interest is determined based on the characteristics information. As previously mentioned, prior art methods provide insufficient information to a user about the point of interest of a file. By providing the user with extra portions of a file which proceed and/or follow the point of interest or portions of another file, the user can easily garner more information about the point of interest. For example, if the point of interest is characterized as a compilation error, an appropriate context can allow the user to easily understand the nature of the problem and can devise an acceptable solution.

The location of the context is determined based on selectively applying one or more contextual boundary rules. The contextual boundary rules may specify what context to include and are used to determine the location of the context within the file. In one embodiment, the location of the context may be configured by the user, whereby the user sets various contextual boundary rules. In another embodiment, which contextual boundary rule to apply is automatically determined based on the reference marker data and other information such as file type.

Contextual boundary rules may be selectively applied considering the file type. For example, computer language files (i.e., computer code) may abide by a different set of contextual boundary rules than word processing files.

Contextual boundary rules may be selectively applied considering the characteristics information. For example, a reference marker may identify a compilation error at the point of interest. A contextual boundary rule which applies to compilation errors may require that X number of lines, sentences, paragraphs, etc. preceding and/or following the location of the point of interest within the file (or another file) be included as the context. Moreover, a reference marker may identify a grammatical error at the point of interest. A contextual boundary rule which applies to grammatical errors may require that all lines within the paragraph of the point of interest be included as the context. Furthermore, a reference marker may identify a point of interest (i.e., function name or a variable) as having a definition. A contextual boundary rule which applies to definitions may require that all statements comprising the definition be included as the appropriate context.

For reference markers that identify mistake/problem-type characteristics of the point of interest, contextual boundary rules may be selectively applied considering the type of mistake and/or the portions of the file that are needed to resolve the mistake. For example, a reference marker may identify a spelling mistake at the point of interest. A contextual boundary rule which applies to spelling mistakes may limit the boundary to X number of words preceding and following the point of interest. This contextual boundary rule recognizes that the nature of the spelling mistake is restricted to the misspelled word alleviating the need to include a large amount of context.

Where the reference marker data indicates that the reference marker identifies a specific type of compilation error, contextual boundary rules may be selectively applied considering the specific type of compilation error. Based on the type of compilation error, the contextual boundary rule identifies the context that is needed to resolve the compilation error. For example, the marker data may indicate that the selected reference marker identifies a parse error-type compilation error at the point of interest. A contextual boundary rule which applies to missing semi-colon errors may require that X number of lines, paragraphs, etc. preceding the parse error be included as the context. Since missing semi-colon errors can be caused by a missing semi-colon in a preceding section of the computer code, this contextual boundary rule may require only preceding portions of the file to be displayed. It is well known by those who are skilled in the art that the actual location of compilation errors may not be exactly identified by the compiler. Instead, the compilation error may be not recognized by the compiler until later in the code. By adding the preceding statements of code as the appropriate context, the user can easily understand the cause of the error and can easily devise a solution. Thus, in one embodiment, the contextual boundary rule applicable to compilation errors are dependent upon the specific type of compilation error (i.e., the reason the compilation failed). An exemplary contextual boundary rule may be applied for unused variable-type compilation errors, requiring that no context should be included. A catch-all contextual boundary rule may require that all other types of compilation errors include ten preceding statements for context. The preceding contextual boundary rule may be pre-configured or may be customizable and configurable by the end user through a setup procedure of the peek system. It should be noted that computer code executes in statements rather than lines; As such, the contextual boundary rules may specify X number of statements or blocks to be included within the boundaries of the subset.

A subset of the file is retrieved at step S4 using the location of the point of interest and the location of the context. The subset is made up of the point of interest and the context portion. The peek system retrieves the subset of the file, for example via a file editor.

At step S5, a message is sent to the renderer to draw the subset in the secondary window and the subset itself is sent as well. The subset includes the point of interest and the context portion. At step S6, the subset is rendered and displayed in a secondary window. The secondary window may be sized to show just the subset. Furthermore, the secondary window may be positioned with a shadow and a speech bubble effect emanating from the selected reference marker in the file overview margin. Other known methods of visually linking the secondary window to the selected reference marker may be used. In one embodiment, a single renderer draws both the main window and its contents as well as the secondary window and its contents. By using the same renderer for both the main and secondary windows, the portion of the file that is rendered in the secondary window has an appearance that exactly matches a rendering of the same portion of the file in the main window.

In one embodiment, the peek system may apply additional formatting to the rendered subset, while preserving the integrity of the original formatting. For example, the color or intensity of the context portion of the subset may be faded-out. This enables clear visual demarcation of the context. The original formatting of the point of interest that corresponds to the selected reference marker is maintained. Moreover, extra whitespace from margins may be clipped-off to minimize the size of the secondary window. The original size of fonts and other formatting is preserved. In another embodiment, the peek system requires the subset to be rendered with a title appearing on the secondary window. The title may be determined from the reference marker data provided by the compiler and/or the application.

In another embodiment, many IDE software packages enable portions of computer code to be folded and hidden from display within the main display window. For example, in Oracle's JDeveloper™ product, entire class definitions may be shown or may be hidden using a collapse or expand handle. Prior art solutions will not display the hidden portion in the tooltip window even if the point of interest which corresponds to the selected reference marker falls within the hidden portion of the code. The methods as taught herein enable the user to view the hidden portion in the secondary window when the user places the cursor over the reference marker in the file overview margin or in the file itself The user experience is greatly simplified because the user can view the hidden portion of the code without having to use the expand handle to view the code in the main window. Thus, other portions of the code which are not displayed within the main window can be viewed without having to scroll though the file in the main window and without disturbing the insertion point within the code in the main window. In the manner discussed above, the peek system determines the reference marker data, appropriate context, and subset of the file, retrieves the subset of the file, and sends a message for rendering the subset along with the subset itself.

FIG. 3 shows a screenshot of an exemplary rendering of a subset 351 which corresponds to a reference marker selected by mouseover of a graphical indicator 325 within a file overview margin 315 of a main window 310. In one embodiment, graphical display 300 includes the main window 310 showing a user interface of an IDE application. The main window 310 displays statements comprising a portion of a computer code file, the entire file of which spans across a plurality of display screens. As such, the main window 310 includes file overview margin 315 to represent the entire file. The file overview margin 315 includes various graphical indicators, such as graphical indicator 325, which serve as reference markers corresponding to a point of interest within the code file. In one embodiment, the graphical indicators were generated by the IDE software running a compilation process. The slider 316 within a scroll bar region 317 indicates the relative location of the portion of the code file that is displayed in the main window 310 to the entire code file. A user selects the reference marker/graphical indicator 325 by hovering a cursor 330 over the graphical indicator 325. In response, secondary window 320 is rendered including the point of interest 340 which corresponds to the selected graphical indicator 325. Additionally, the secondary window is rendered including a context portion. As shown, the context portion includes two statements preceding and one statement following the point of interest 340. A title 350, indicating the nature of the mark, is also provided. Thus, the secondary window 320 enables the user to view a portion of the code file which is not displayed in the main window 310 without displacing an insertion point 352 and without scrolling through the file, such as by using the slider 316.

Figure 4A:
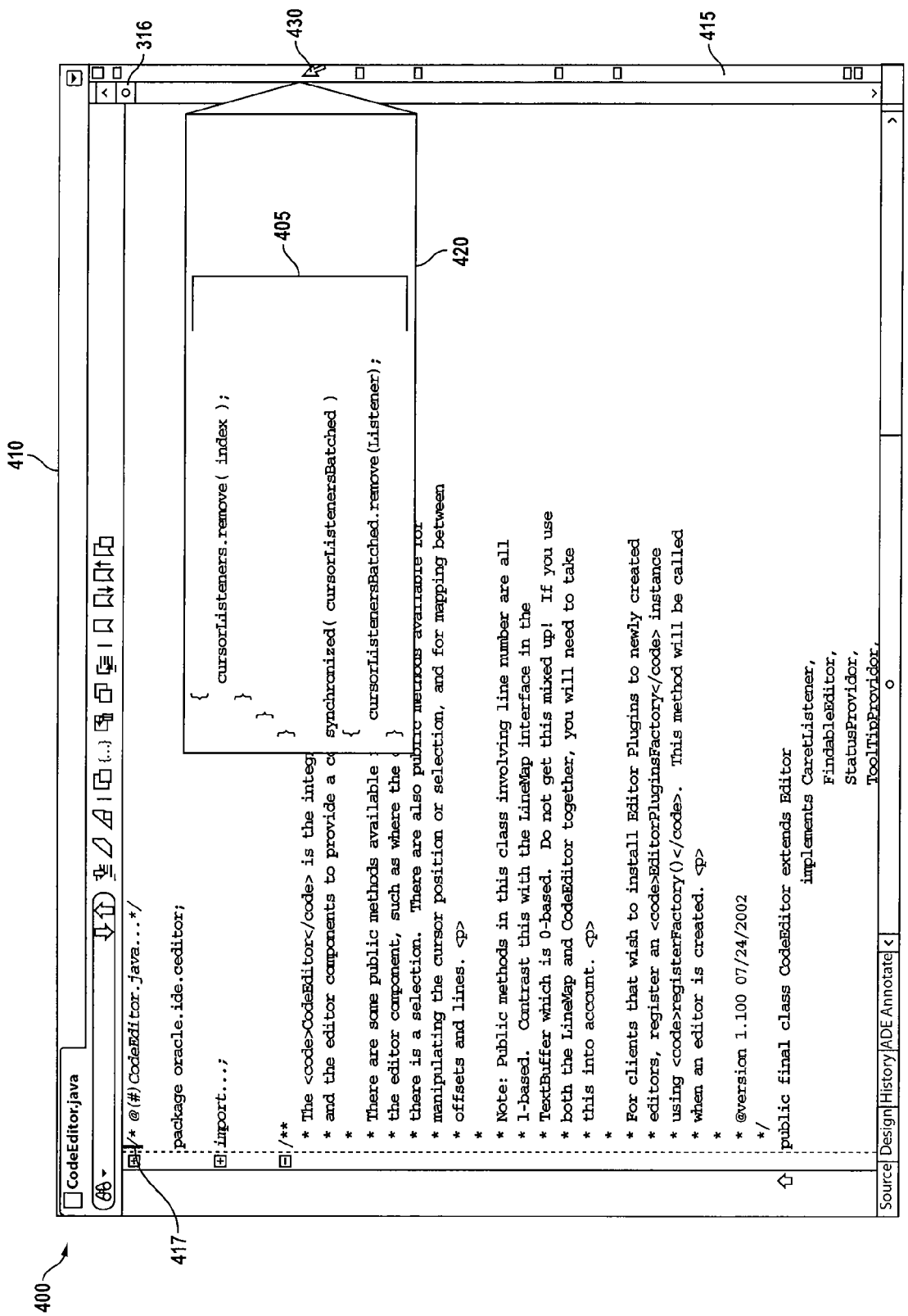
FIG. 4A shows a screenshot of an exemplary rendering of a subset which corresponds to a reference marker selected by positioning a cursor within a file overview margin of a main window.
Figure 4B:
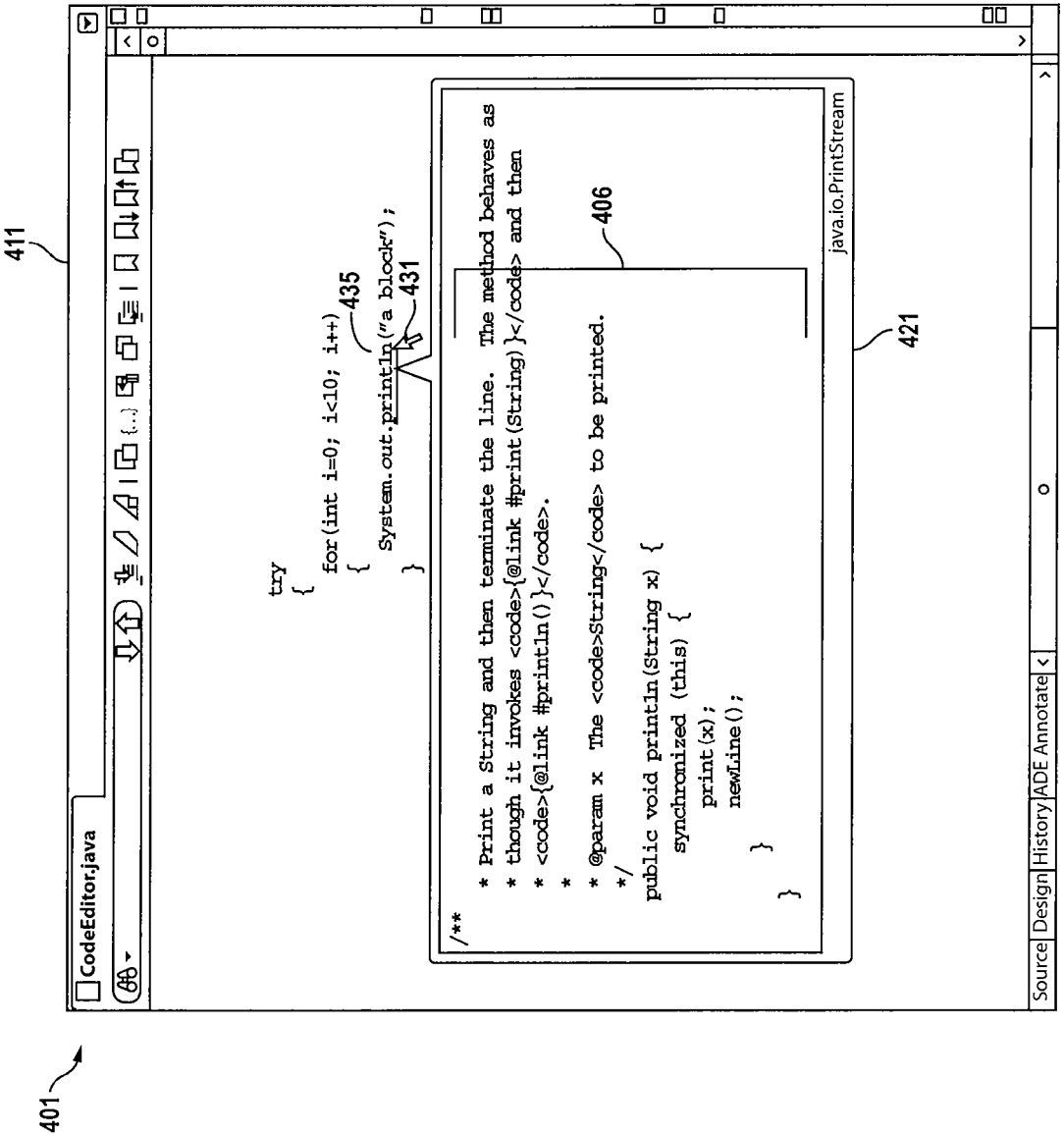
FIG. 4B shows a screenshot of an exemplary rendering of a subset which corresponds to a reference marker selected by positioning a cursor over an element in a file displayed in a main window.

FIG. 4A shows a screenshot of an exemplary rendering of a subset 405 which corresponds to a reference marker selected by positioning a cursor 430 within a file overview margin 415 of main window 410. In one embodiment, graphical display 400 includes the main window 410 and secondary window 420. The secondary window 420 is generated in response to a user positioning the cursor 430 over a portion of the file overview margin 415 and depressing a key or right-clicking a mouse. Since every position within the file overview margin 415 is associated with a relative section of the code file, the secondary window 420 may be rendered showing the subset 405 as the relative section of the code file. Again, the secondary window 420 enables the user to view a portion of the code which is not displayed in the main window 410 without displacing the insertion point 417 and without scrolling through the file such as by using the slider 316.

FIG. 4B shows a screenshot of an exemplary rendering of a subset 406 which corresponds to a reference marker 435 selected by positioning a cursor 431 over an element in a file displayed in a main window 411. In one embodiment, graphical display 401 shows the reference marker 435 as an element in the file (i.e., a function name) which is defined within the file displayed in the main window 411 or in another file. When the user hovers the cursor 431 over the reference marker 435 within the main window 411 and depresses a key, a subset 406 of the file (i.e., the function definition) is displayed in the secondary window 421. Thus, the reference marker need not be limited to the overview margin.

In another embodiment, when the user hovers the cursor 431 over the reference marker 435, the subset 406 may be from another file. For example, the "println( )" function definition shown as the subset 406 is defined in a separate header file. As long as the compiler is aware of various files which are related (i.e., requiring linking in order to generate the executable file), the point of interest and the subset may be from a file different than the file being displayed in the main window.

FIG. 4C shows another screenshot of an exemplary rendering of a subset 407 which corresponds to a reference marker 440 selected by positioning a cursor 432 over an element in a file displayed in a main window 412. In one embodiment, graphical display 402 shows the reference marker 440 as an element in the file (i.e., a variable) which is defined within the file. When the user hovers the cursor 432 over the reference marker 440 within the main window 412 and depresses a key, a subset 407 of the file (i.e., the variable definition) is displayed in the secondary window 422.

Various methods of performing a user selection have been described herein. It should be recognized that other known methods of selecting using a graphical user interface may also be used without departing from the scope of the embodiments as taught herein.

Figure 5:
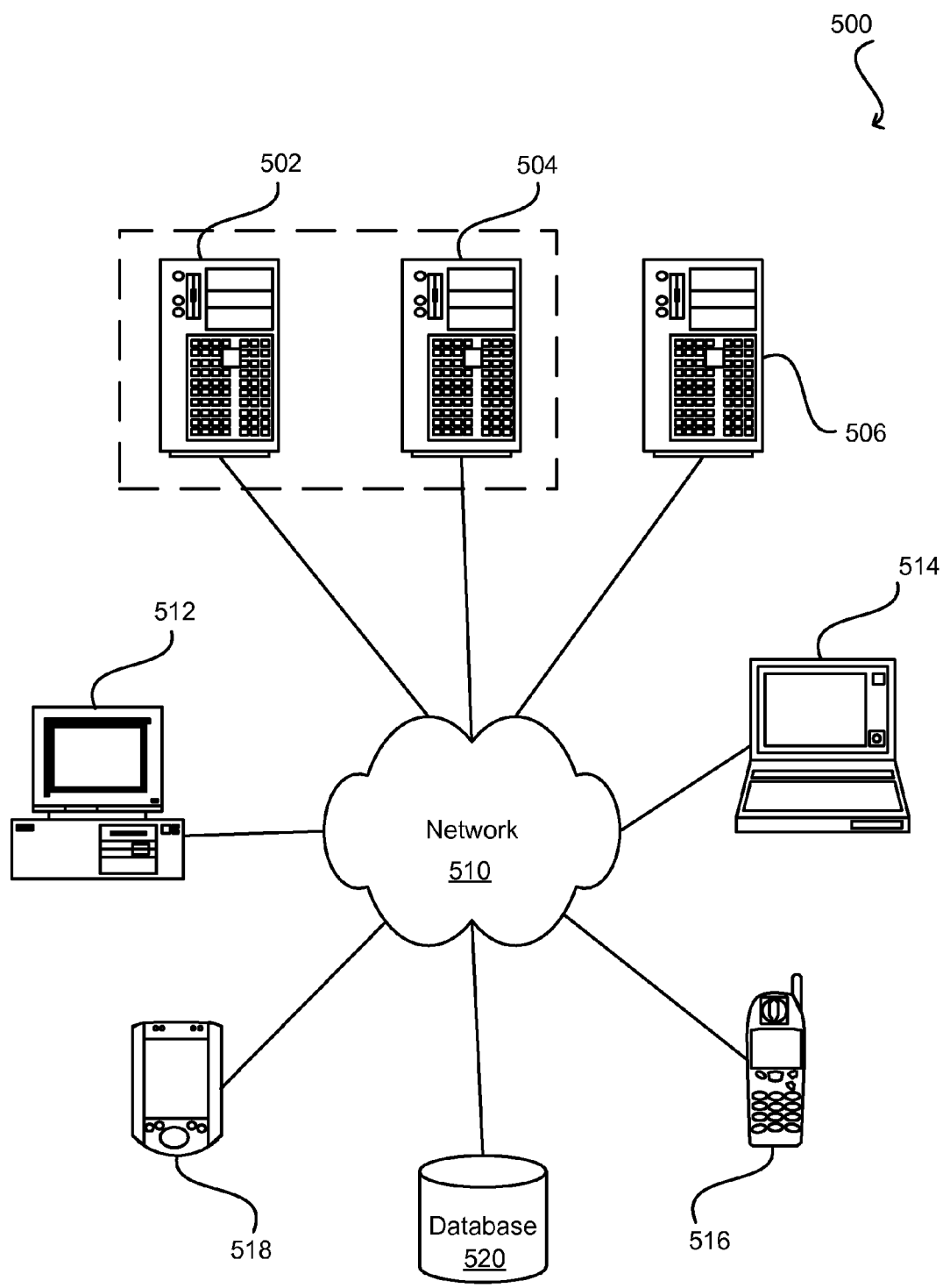
FIG. 5 is a block diagram illustrating components of an exemplary operating environment in which various embodiments of the present invention may be implemented.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g. a network operating under any of the IEEE 802.11 suite of protocols, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
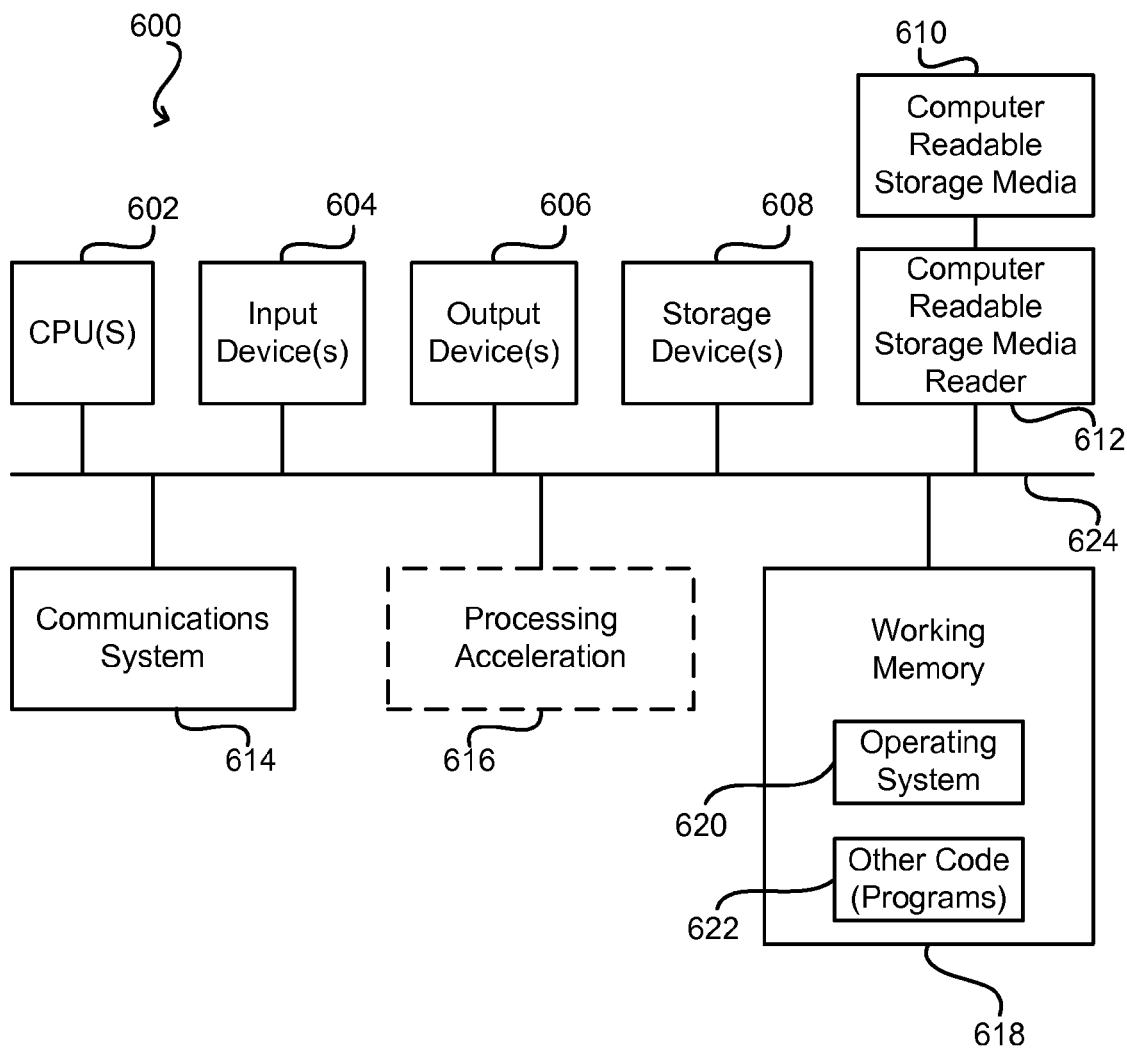
FIG. 6 illustrates an exemplary computer system in which various embodiments of the present invention may be implemented.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Although the present invention has been described in detail with regarding the exemplary embodiments and drawings thereof, it should be apparent to those skilled in the art that various adaptations and modifications of the present invention may be accomplished without departing from the spirit and the scope of the invention. Thus, by way of example and not of limitation, the present invention is discussed with regard to treemap components as illustrated by the figures. However, the methods may be implemented for various data visualizations, both hierarchical and non-hierarchical in nature, unless specified otherwise. Accordingly, the invention is not limited to the precise embodiment displayed in the drawings and described in detail herein above. The scope of the invention should, therefore, be determined not with reference to the above description, but instead should be determined with reference to the pending claims along with their full scope or equivalents.

What is claimed is:

1. A computer-implemented method performed by an integrated development environment (IDE) having a code editor, the method comprising:
receiving, at one or more computer systems, information indicative of a selection of a graphical non-textual reference marker made in a main window of a user interface of the code editor having a file overview margin that represents entirety of a file having a viewable portion displayed in the main window together with one or more graphical non-textual reference markers within the file overview margin, the graphical non-textual reference marker corresponding to a point of interest in the file and the graphical non-textual reference marker identifying one or more characteristics of the point of interest;
determining, with one or more processors associated with the one or more computer systems, a location of the point of interest in the file based on the graphical non-textual reference marker;
determining, with the one or more processors associated with the one or more computer systems, a contextual boundary rule from a plurality of contextual boundary rules defined by one or more end-users of the IDE separately from contents of files opened in the code editor based upon at least one characteristic of the graphical non-textual reference marker and the file;
determining, with the one or more processors associated with the one or more computer systems, a context portion of the file that satisfies the contextual boundary rule, the context portion comprising one or more lines, words, or statements;
determining, with the one or more processors associated with the one or more computer systems, a location of the context portion of the file relative to the location of the point of interest in the file, the location of the context portion of the file relative to the location of the point of interest in the file in the main window being different from the location of the point of interest in the file in the main window;
retrieving, with the one or more processors associated with the one or more computer systems, a subset of the file using the location of the point of interest and the location of the context portion of the file relative to the location of the point of interest in the file; and
generating, with the one or more processors associated with the one or more computer systems, information configured to display the subset of the file in a secondary window of the user interface using a fading technique applied to the subset of the file and visually connecting the secondary window to the graphical non-textual reference marker within the file overview margin such that at least a part of the viewable portion of the file displayed in the main window of the user interface is concurrently displayed in the user interface with the subset of the file in the secondary window of the user interface.

2. The method of claim 1, wherein determining the contextual boundary rule from the plurality of contextual boundary rules defined by the one or more end-users of the IDE further comprises determining one or more contextual boundary rules based on one or more characteristics of the point of interest corresponding to the graphical non-textual reference marker provided by another application.

3. The method of claim 1, wherein determining the contextual boundary rule from the plurality of contextual boundary rules defined by one or more end-users of the IDE further comprises determining at least one of spelling mistake, compilation error, and bookmark contextual boundary rule from a plurality of contextual boundary rules pre-configured in the IDE.

4. The method of claim 1, wherein receiving the information indicative of the selection of the graphical non-textual reference marker comprises receiving at least position of a cursor within the file overview margin of the main window together with information provided by a compiler.

5. The method of claim 1, wherein receiving the information indicative of the selection of the graphical non-textual reference marker comprises receiving at least position of a cursor in proximity to the graphical non-textual reference marker within the file overview margin of the main window and one of a function name and a variable of the file displayed in the main window, wherein the one of the function name and the variable is defined within the file.

6. The method of claim 1, further comprising:
generating information configured to display a title in the secondary window in proximity to the display of the subset of the file in the secondary window, wherein the title is determined based on data provided by a compiler.

7. The method of claim 1, wherein generating the information configured to display the subset of the file in the secondary window of the user interface further comprises applying a shadow or a speech bubble effect when positioning the subset of the file in the secondary window, the shadow or a speech bubble effect emanating from the graphical non-textual reference marker within the file overview margin.

8. The method of claim 1, wherein generating the information configured to display the subset of the file in the secondary window of the user interface further comprises generating information applying a clipping technique to the subset of the file in the secondary window.

9. The method of claim 1, wherein generating the information configured to display the subset of the file in the secondary window comprises generating information configured to visually connect the subset of the file in the secondary window to the graphical non-textual reference marker without moving an insertion point in the main window and without scrolling through the file in the main window.

10. A computer-implemented method performed by an integrated development environment (IDE) having a code editor, the method comprising:
receiving, at one or more computer systems, information indicative of a selection of a graphical non-textual reference marker made in a main window of a user interface of the code editor having a file overview margin that represents entirety of a first file having a viewable portion displayed in the main window together with one or more graphical non-textual reference markers within the file overview margin, the graphical non-textual reference marker corresponding to a point of interest located in a second file and the graphical non-textual reference marker identifying one or more characteristics of the point of interest;
determining, with one or more processors associated with the one or more computer systems, a location of the point of interest in the second file based on the graphical non-textual reference marker;
determining, with the one or more processors associated with the one or more computer systems, a contextual boundary rule from a plurality of contextual boundary rules defined by one or more end-users of the IDE separately from contents of files opened in the code editor based upon at least one characteristic of the graphical non-textual reference marker and the point of interest in the second file;

determining, with the one or more processors associated with the one or more computer systems, a context portion of the second file that satisfies the contextual boundary rule, the context portion comprising one or more lines, words, or statements;

determining, with the one or more processors associated with the one or more computer systems, a location of the context portion of the second file relative to the location of the point of interest in the second file, the location of the context portion of the second file relative to the location of the point of interest in the second file being different from the location of the point of interest in the second file;

retrieving, with the one or more processors associated with the one or more computer systems, a subset of the second file using the location of the point of interest and the location of the context portion of the second file relative to the location of the point of interest in the second file; and generating, with the one or more processors associated with the one or more computer systems, information configured to render the subset of the second file in a secondary window of the user interface bounded by the main window using a fading technique applied to the subset of the file and visually connecting the secondary window to the graphical non-textual reference marker within the file overview margin such that at least a part of the viewable portion of the first file configured to be rendered in the main window of the user interface is concurrently configured to be rendered in the user interface with the subset of the second file configured to be rendered in the secondary window of the user interface.

11. The method of claim 10, wherein receiving the information indicative of the selection of the graphical non-textual reference marker comprises receiving information indicative of a mouseover of one or more graphical non-textual reference markers corresponding to one of a variable and a function defined in the second file.

12. The method of claim 10, wherein determining the location of the point of interest in the second file comprises determining location of a definition associated with the graphical non-textual reference marker, wherein the definition is one of a variable definition or a function definition in the second file.

13. A system comprising:
a processor; and
a memory, in communication with the processor and configured to store a set of instructions which when executed by the processor configure the processor to:
receive a selection of a graphical non-textual reference marker made in a main window of a user interface of a code editor of an integrated development environment (IDE) having a file overview margin that represents entirety of a file having a viewable portion displayed in the main window together with one or more graphical non-textual reference markers within the file overview margin, the graphical non-textual reference marker corresponding to a point of interest in the file and the graphical non-textual reference marker identifying one or more characteristics of the point of interest;

determine, based on the selection of the graphical non-textual reference marker, a location of the point of interest in the file;

determine a contextual boundary rule from a plurality of contextual boundary rules defined by one or more end-users of the IDE separately from contents of files opened in the code editor based upon at least one characteristic of the graphical non-textual reference marker and the file;

determine a context portion of the file that satisfies the contextual boundary rule, the context portion comprising one or more lines, words, or statements;

determine a location of the context portion of the file relative to the location of the point of interest in the file, the location of the context portion of the file relative to the location of the point of interest in the file being different in the main window from the location of the point of interest in the file in the main window;

retrieve a subset of the file using the location of the point of interest and the location of the context portion of the file relative to the location of the point of interest in the second file; and generate information configured to display the subset of the file in a secondary window of the user interface bounded by the main window using a fading technique applied to the subset of the file and visually connecting the secondary window to the graphical non-textual reference marker within the file overview margin such that at least a part of the viewable portion of the file being displayed in the main window of the user interface is concurrently displayed in the user interface with the subset of the file being displayed in the secondary window of the user interface.

14. The system of claim 13 wherein to determine the contextual boundary rule from the plurality of contextual boundary rules defined by the one or more end-users of the IDE the processor is further configured to determine one or more contextual boundary rules based on one or more characteristics of the point of interest corresponding to the graphical non-textual reference marker provided by another application.

15. The system of claim 13 wherein to determine the contextual boundary rule from the plurality of contextual boundary rules defined by the one or more end-users of the IDE the processor is further configured to determine at least one of spelling mistake, compilation error, and bookmark contextual boundary rule from a plurality of contextual boundary rules pre-configured in the IDE.

16. A non-transitory computer-readable medium storing a computer program executable by a processor of a computer system, the non-transitory computer-readable medium comprising:
code for receiving information indicative of a selection of a graphical non-textual reference marker made in a main window of a user interface of a code editor of an integrated development environment (IDE) having a file overview margin that represents entirety of a file having a viewable portion displayed in the main window together with one or more graphical non-textual reference markers within the file overview margin, the graphical non-textual reference marker corresponding to a point of interest in the file and the graphical non-textual reference marker identifying one or more characteristics of the point of interest;

code for determining, based on the selection of the graphical non-textual reference marker, a location of the point of interest in the file;

code for determining a contextual boundary rule from a plurality of contextual boundary rules defined by one or more end-users of the IDE separately from contents of files opened in the code editor based upon at least one characteristic of the graphical non-textual reference marker and the file;

code for determining, based on the contextual boundary rule, a context portion of the file that satisfies the contextual boundary rule, the context portion comprising one or more lines, words, or statements;

code for determining, based on the context portion, a location of the context portion of the file relative to the location of the point of interest in the file, the location of the context portion of the file relative to the location of the point of interest in the file being different in the main window from the location of the point of interest in the file in the main window;

code for retrieving a subset of the file using the location of the point of interest and the location of the context portion of the file relative to the location of the point of interest in the second file; and code for generating information configured to display the subset of the file in a secondary window of the user interface bounded by the main window using a fading technique applied to the subset of the file and visually connecting the secondary window to the graphical non-textual reference marker within the file overview margin such that at least a part of the viewable portion of the file being displayed in the main window of the user interface is concurrently displayed in the user interface with the subset of the file being displayed in the secondary window of the user interface.

17. The non-transitory computer-readable medium according to claim 16, wherein the code for determining the contextual boundary rule from the plurality of contextual boundary rules defined by the one or more end-users of the IDE further comprises code for determining one or more contextual boundary rules based on one or more characteristics of the point of interest corresponding to the graphical non-textual reference marker provided by another application.

18. The non-transitory computer-readable medium according to claim 17, wherein the code for determining the contextual boundary rule from the plurality of contextual boundary rules defined by the one or more end-users of the IDE further comprises code for determining at least one of spelling mistake, compilation error, and bookmark contextual boundary rule from a plurality of contextual boundary rules pre-configured in the IDE.

19. The method of claim 1, wherein determining the contextual boundary rule from the plurality of contextual boundary rules defined by the one or more end-users of the IDE further comprises determining the contextual boundary rule based upon a type of the file.

* * * * *

UNITED STATES PATENT AND TRADEMARK OFFICE
CERTIFICATE OF CORRECTION

PATENT NO. : 8,887,089 B2
APPLICATION NO. : 12/029686
DATED : November 11, 2014
INVENTOR(S) : Cochrane It is certified that error appears in the above-identified patent and that said Letters Patent is hereby corrected as shown below:

In the Specification

In column 4, line 56, delete "speadsheets," and insert -- spreadsheets, --, therefor.

In column 6, line 14, delete "Calif." and insert -- Calif., --, therefor.

In column 9, line 49, delete "toXnumber" and insert -- to X number --, therefor.

In column 11, line 3, delete "itself" and insert -- itself. --, therefor.

In column 13, line 2, delete "(e.g." and insert -- (e.g., --, therefor.

Signed and Sealed this
Sixteenth Day of June, 2015

Michelle K. Lee
*Director of the United States Patent and Trademark Office*